(12) United States Patent
Onodi et al.

(10) Patent No.: US 10,601,168 B2
(45) Date of Patent: Mar. 24, 2020

(54) PLUG CONNECTION KIT, INSTALLATION KIT, AND ELECTRICAL INSTALLATION

(71) Applicant: Woertz Engineering AG, Muttenz (CH)

(72) Inventors: Tamas Onodi, Thalwil (CH); Andreas Dreier, Nunningen (CH)

(73) Assignee: Woertz Engineering AG, Muttenz (CH)

( * ) Notice: Subject to any disclaimer, the term of this patent is extended or adjusted under 35 U.S.C. 154(b) by 0 days.

(21) Appl. No.: 16/125,867

(22) Filed: Sep. 10, 2018

(65) Prior Publication Data
US 2019/0081436 A1   Mar. 14, 2019

(30) Foreign Application Priority Data

Sep. 12, 2017   (EP) ..................................... 17190596

(51) Int. Cl.
*H01R 13/52* (2006.01)
*H01R 13/40* (2006.01)
(Continued)

(52) U.S. Cl.
CPC ....... *H01R 13/5219* (2013.01); *H01R 13/506* (2013.01); *H01R 13/5213* (2013.01); *H01R 13/5845* (2013.01); *H01R 13/684* (2013.01); *H02G 3/088* (2013.01); *H01R 13/688* (2013.01); *H01R 31/065* (2013.01); *H02G 15/013* (2013.01); *H02G 15/115* (2013.01)

(58) Field of Classification Search
CPC .............. H01R 13/5219; H01R 13/506; H01R 13/5213; H01R 13/5845; H01R 13/684; H01R 13/688; H01R 31/065; H02G 3/088; H02G 15/013; H02G 15/115
USPC .......................................... 439/271, 587–560
See application file for complete search history.

(56) References Cited

U.S. PATENT DOCUMENTS 4,545,632 A * 10/1985 Maier .................... H01R 25/00
                                                        439/148
6,486,766 B1 * 11/2002 Reid ..................... H01H 85/201
                                                        337/180
(Continued)

FOREIGN PATENT DOCUMENTS

DE       10054714 A1     5/2002
EP        1150392 A1    10/2001
JP       2016072049 A    5/2016

*Primary Examiner* — Abdullah A Riyami
*Assistant Examiner* — Thang H Nguyen
(74) *Attorney, Agent, or Firm* — Frost Brown Todd LLC

(57) ABSTRACT

A plug connection kit for connecting a branch line to a through line, comprising a plug housing and a socket housing that enclose contact inserts. Flexible cable ends are molded onto the plug housing and socket housing. The plug housing and socket housing are each manufactured by casting plastic onto a base body with the contact inserts and flexible cable ends connected thereto inserted, thus forming a solid one-piece plug and a solid one-piece socket. The female and male contact inserts are electrically connectable to one another in a contact area between the plug housing and the socket housing. The plug connection kit also includes a sealing sleeve that encases the plug housing, the socket housing, and the contact area between the two housings in order to protect the plug connection kit from penetration of water and/or dust.

13 Claims, 9 Drawing Sheets

(51) Int. Cl.
*H01R 13/58* (2006.01)
*H02G 3/08* (2006.01)
*H01R 13/506* (2006.01)
*H01R 13/684* (2011.01)
H02G 15/115 (2006.01)
H02G 15/013 (2006.01)
H01R 31/06 (2006.01)
H01R 13/688 (2011.01)

(56) References Cited

U.S. PATENT DOCUMENTS

| | | | | |
|---|---|---|---|---|
| 6,582,251 B1* | 6/2003 | Burke | ............... | H01R 13/5202 |
| | | | | 439/589 |
| 7,150,642 B1* | 12/2006 | Bakke | ................... | A01G 25/16 |
| | | | | 439/271 |
| 7,854,629 B1* | 12/2010 | Albers | ................. | E21B 17/023 |
| | | | | 439/271 |
| 2011/0034041 A1* | 2/2011 | Sivik | ....................... | H02G 3/22 |
| | | | | 439/32 |
| 2013/0137285 A1* | 5/2013 | Miura | ................... | H01R 12/81 |
| | | | | 439/271 |
| 2014/0213074 A1* | 7/2014 | Tsang | ................. | H01R 13/518 |
| | | | | 439/37 |
| 2015/0118880 A1* | 4/2015 | Murphy | ................ | H01R 24/38 |
| | | | | 439/271 |
| 2016/0036161 A1* | 2/2016 | Brown | ................... | H01R 39/64 |
| | | | | 439/271 |
| 2016/0190742 A1* | 6/2016 | Jozwik | ............... | H01R 13/622 |
| | | | | 439/271 |
| 2017/0149170 A1* | 5/2017 | Tait | ..................... | H01R 13/506 |
| 2017/0294737 A1* | 10/2017 | Horchler | ............. | H01R 13/521 |

* cited by examiner

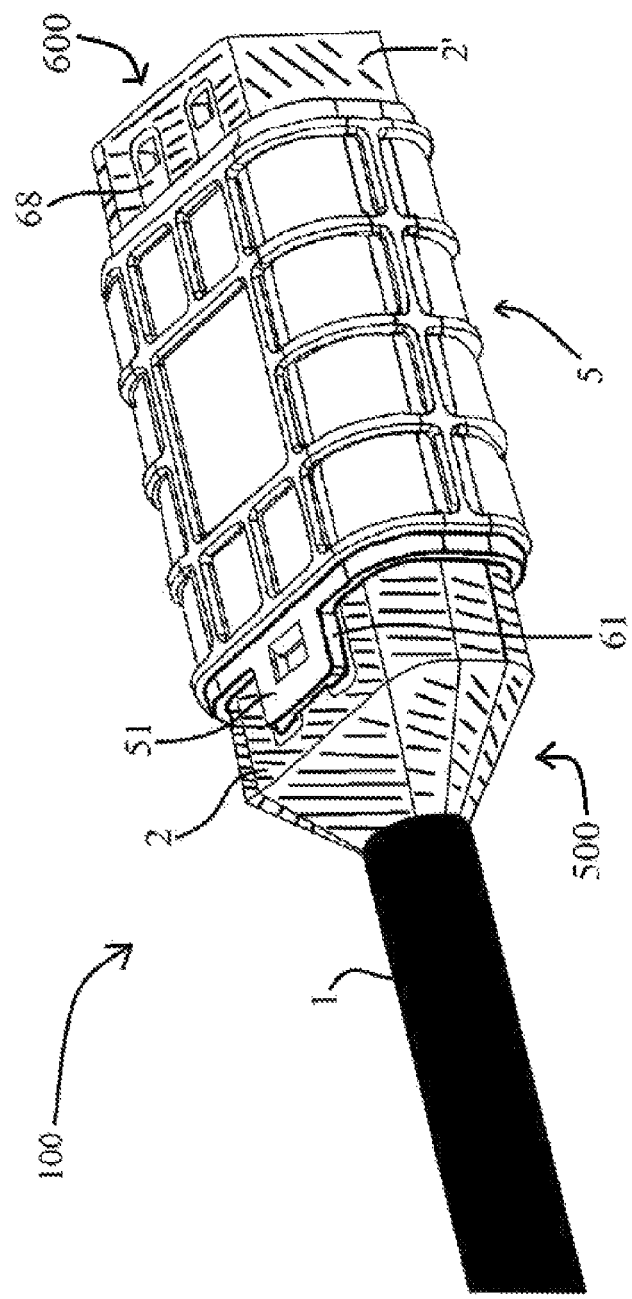

PLUG CONNECTION KIT, INSTALLATION KIT, AND ELECTRICAL INSTALLATION

FIELD OF THE INVENTION

The invention relates to a plug connection kit for connecting two cables, which is protected from penetration of water or dust, an installation kit, and an electrical installation having this plug connection kit.

BACKGROUND OF THE INVENTION

EP 1 150 392 A1 relates to an electrical connection for high-pressure environments, in which cable contacts are situated within a high pressure-resistant housing.

BRIEF DESCRIPTION OF THE INVENTION

A first aspect of the invention relates to a plug connection kit for connecting a branch line to a through line, comprising a plug housing having male contact inserts, a socket housing having female contact inserts, and at least two flexible cable ends, wherein one flexible cable end is molded onto the plug housing and one flexible cable end is molded onto the socket housing. In the process, the female and male contact inserts are each fixedly connected to cable cores in the flexible cable ends, wherein the plug housing and the socket housing are each manufactured by casting plastic onto a base body with the contact inserts inserted and flexible cable ends connected thereto, thus forming a solid one-piece plug and a solid one-piece socket. The female and male contact inserts are electrically connectable to one another in a contact area between the plug housing and the socket housing. The plug connection kit also includes a sealing sleeve that encases the plug housing, the socket housing, and the contact area between the two housings in order to protect the plug connection kit from penetration of water and/or dust.

Another aspect relates to an installation kit having at least one flat cable, at least one plug connection kit according to the first aspect, and at least one branch line.

A further aspect relates to an electrical installation that includes a through line designed as a flat cable, at least one plug connection kit according to the first aspect, and at least one branch line that is connected to the flat cable by a plug connection kit in each case.

GENERAL DESCRIPTION, ALSO WITH REGARD TO OPTIONAL EMBODIMENTS OF THE INVENTION

A first aspect of the invention relates to a plug connection kit for connecting a branch line to a through line. The through line may be designed as a flat cable, while the branch line may be designed as a round cable. Round cables are cables whose cores generally extend twisted in the longitudinal direction of the cable. For flat cables, the cores extend essentially in parallel over the entire length of the cable.

The plug connection kit includes a plug housing that encloses male contact inserts. The male contact inserts are designed, for example, as plastic molded parts with contact tips that exit in the plug-in the direction, wherein the typically metallic surface of the contact tips may have a circular, pointed, flat, tapering, or angular design.

The plug connection kit also includes a socket housing that encloses female contact inserts. The female contact inserts are designed, for example, as plastic molded parts with a cavity for accommodating the contact tips. The cavity has conductive elements, for example, for establishing electrical contact between the female and male contact inserts.

The female and male contact inserts are thus electrically connectable in a contact area between the plug housing and the socket housing.

The plug connection kit includes at least two flexible cable ends; these flexible cable ends are typically provided at the current input- and current output-side ends of the plug connection kit. One flexible cable end is molded onto the plug housing, and one flexible cable end is molded onto the socket housing, i.e., cast onto the plug housing and the socket housing by means of an injection molding process. The flexible cable end is, for example, connected to a round cable core on the plug housing side, and on the socket housing side may be connected either to a round cable or to a branch line socket that contacts a through line. Cable cores, which as a result of the casting onto the plug housing and socket housing are at least partially enclosed by the flexible material, extend through the completely filled flexible cable end. The female and male contact inserts are each fixedly connected to cable cores in the flexible cable ends by ultrasonic welding, for example.

An elastic material, for example, is used for the casting in order to make the cable ends flexible. This elastic material may also be a plastic with elastic properties. Due to the flexibility of the cable ends, the plug connection kit is bendable in the area of its ends, and therefore may also be used for nonlinear connections of two cables, for example for a contact for which, although a through line is contacted by a branch socket perpendicular to the extension direction of the through line, the branch line thus supplied is not intended to be led away perpendicularly from the through line.

The plug housing and the socket housing are each manufactured by casting plastic onto a base body with the inserted contact inserts and flexible cable ends connected thereto, thus forming a solid one-piece plug or a solid one-piece socket. The plug housing includes a plug housing base body, and the socket housing includes a socket housing base body.

In addition to the flexible cable ends, the plug housing and the socket housing themselves are each manufactured by injection molding, for example; the interior of the housing is also completely filled by means of injection molding, for example. The male and female contact inserts are filled into the respective housing in the area of the plug housing or the socket housing. As a result, the plug housing together with the cast-on cable end as well as the socket housing together with the cast-on cable end have class IP65 protection from penetration of water or dust.

To also provide sufficient protection from penetration of water or dust for the above-mentioned contact area of the male and female contact inserts, in which the plug housing and the socket housing are plugged together, the plug connection kit includes a sealing sleeve that encases the plug housing, the socket housing, and the contact area between the two housings.

Lastly, the sealing sleeve provides the entire plug connection kit with at least class IP65, ideally with class IP68, protection from penetration of dust and water. In addition, the sealing sleeve provides additional contact protection in particular for the electrical contact points of the plug connection kit in order to make handling safer, also during installation. The sealing sleeve is made of hard plastic or other plastics, for example.

In some embodiments, the material from which the plug housing and the socket housing are cast includes at least one plastic, and the material that is molded onto this housing to form the flexible cable ends includes at least one elastomer.

The cast-on portion of the socket housing and of the plug housing is made, for example, from a polyolefin, such as high-density polyethylene (PE-HD), to make the plug and socket mechanically stable and to provide them with sealtightness against water or dust. Polyolefin plastic or polyethylene plastic is cast onto the base body, which may likewise be made of this material. For example, the base body is likewise cast with these same plastics, i.e., filled with injection molding material. The at least one elastomer from which the flexible cable ends are cast is, for example, a vulcanized material made of natural rubber or silicone rubber.

Due to casting the flexible cable end, made of elastomer, onto the socket housing and plug housing made of solid, i.e., comparatively less flexible, plastic, a type of articulated joint is produced in each case in the transition area between the sockets and the cables and sockets connected to the flexible cable ends, to allow use of the plug connection kit also for nonlinear branches, as described above, while at the same time maintaining at least class IP65 protection from penetration of water or dust in this area.

The plug housing or socket housing together with the cast-on flexible cable ends forms the solid one-piece plug or the solid one-piece socket, respectively. "Solid" refers to the fact that the plug or the socket has no internal cavities due to the casting.

In some embodiments, a seal is mounted in each case on the plug housing and the socket housing in order to protect the contact area from penetration of water or dust.

The plug housing or the socket housing, respectively, together with the seal is inserted into the sealing sleeve. The inlet and outlet areas of the sealing sleeve are thus also protected from penetration of water or dust when the plug housing and the socket housing are inserted into the respective openings in the sealing sleeve. Otherwise, water or dust could penetrate into the sealing sleeve through a space possibly present between the sealing sleeve and the inserted plug housing or socket housing, and could thus also penetrate in the direction of the contact area of the plug connection kit. As mentioned above, this contact area is the area in which the male and female contact inserts are plugged together in order to close the electrical contact between the socket housing and the plug housing.

In some embodiments, the seal is a sealing ring, and the plug housing and the socket housing each have a groove on their outer side for accommodating the sealing ring. Inserting the locking rings into the groove ensures that the sealing rings remain at their intended position, even when the plug housing or socket housing is pushed into the sealing sleeve. The spacing of the groove from the side of the socket housing or of the plug housing facing the sealing sleeve is such that, after the plug housing and the socket housing are pushed into the sealing sleeve up to the stop 82 (FIG. 8), the sealing ring comes to rest inside the sealing sleeve and seals off the space between the sealing sleeve and the solid one-piece plug or solid one-piece socket.

In some embodiments, the sealing sleeve at its inner side is equipped with a sealing element in each case in the inlet area and outlet area of the sealing sleeve. The sealing elements then also rest inside the sealing sleeve, and likewise seal a space between the plug housing/socket housing and the sealing sleeve when the housings are inserted into the sealing sleeve. In this embodiment, the plug housing and the socket housing do not have to be fitted with a sealing element, but instead are inserted into a sealing sleeve that is already provided with sealing elements at its inlet and outlet.

In some embodiments, the sealing element inserted into the sealing sleeve is a sealing ring, and the sealing sleeve has a groove in its inlet and outlet areas for accommodating the sealing ring.

Both variants have equivalent protection from penetration of water or dust.

In some embodiments, the sealing sleeve has a lock with which the sealing sleeve may be fixed to the socket housing or the plug housing or to both. This ensures that the sealing sleeve can no longer slip in its position, at least in one direction, after a plug-in connection is established between the plug housing or the male contact inserts situated therein and the socket housing or the female contact inserts situated therein.

As a result, the contact area of the plug-in connector is not released in a specified direction, even when acted on by tensile force. This is used on the one hand to protect from penetration of water or dust, and on the other hand is used for safety, since the sealing sleeve cannot be detached due to improper handling and expose the contact area; rather, it can be pulled off only after the lock is intentionally released.

In some embodiments, the lock is designed as a snapaction system that is mounted on one end of the sealing sleeve, and that can snap onto a bracket on the plug housing or on the socket housing.

The elastomer or the elastic plastic that is injected onto the housings to form the molded-on cable ends may partially or completely enclose the socket housing or the plug housing. For example, no elastomer is applied at the locations where the above-mentioned bracket(s) is/are provided for fastening the sealing sleeve to at least one of the housings, so that the snap-action system can snap into the brackets. The snap-action system may be implemented by snap inserts made of plastic, which in the pressed-together state are inserted into the brackets and then re-expand to fix the inserts in the bracket.

In some embodiments, the male and female contact inserts are made of metal and are fixedly connected to the cable cores by ultrasonic welding. The female and male contact inserts may snap into a contact position in the plug housing or the socket housing by means of a snap-action system that is provided in the plug housing or socket housing. The male and female contact inserts are in a contact position when they protrude far enough from the plug housing or the socket housing that, when the plug housing and the socket housing are plugged together (inside the sealing sleeve), i.e., the electrical contact is established, the male contact insert penetrates up to a stop in the female contact insert.

Due to the snapping in of the contact inserts, they are fixed to the respective plug housing or socket housing during the plugging-in operation, so that they cannot move back in the direction opposite the plug-in direction.

In some embodiments, the plug connection kit includes a fuse block, placed between the socket housing and the plug housing, having at least one fuse holder and at least one fuse insert for at least one fuse-protected core, and electrical contact points for nonfuse-protected cores. The fuse block essentially forms the contact area in which the female contact inserts are connected to the male contact inserts.

The fuse block may be designed as a plastic molded part that includes fuse holders for plug-in fuses for fuse-protected cores, for example, into which the contact inserts may be inserted, and conducting elements at which the contact inserts of the nonfuse-protected cores may be connected to one another.

Thus, for example, a fuse holder, for example including two securing plates for contacting the fuses, and a fuse insert, designed as a plug-in fuse, may be provided in each case for all contact inserts that are connected to phase-conducting cores of the line to be connected, while for contact inserts that are connected to neutral conductors or protective conductors, conducting elements are provided which accommodate the contact inserts at their respective ends. A female contact insert that is connected to a fuse-protected core may instead be designed with a cavity, described above, for accommodating the male contact insert at its tip, with a securing plate for contacting a plug-in fuse.

A male contact insert that is connected to a fuse-protected core may be designed as a contact pin which is provided for contacting a securing plate, and which when plugged in contacts a securing plate that is already present in the fuse block.

In some embodiments, the fuse holder may be uninstalled only on the side of the socket housing in order to replace the fuse. The fuse holder is uninstalled, for example, after pulling out the socket housing together with the female contact inserts, as the result of which, in designs in which the female contact insert itself has a securing plate, the fuse inserts are already exposed for replacement.

In embodiments in which the conducting elements in the fuse block have securing plates for accommodating the fuse, and the female contact element is connected to such conducting elements, after pulling off the socket housing it is also necessary to pull off the portion of the conducting elements on the socket side prior to replacement of the fuse.

In some embodiments, the sealing sleeve has a stop for the plug housing, so that the fuse replacement can be carried out only in the absence of current. When the fuse block is removed from the sealing sleeve in order to replace the fuse, due to the stop in the sealing sleeve the plug housing cannot be pulled out as well or slide down, as the result of which the electrical connection between the contact inserts of the plug housing and the fuse holder in the fuse block is separated when the fuse block is pulled out. This ensures that no current flows through the fuse inserts during replacement of the fuse.

Another aspect relates to an installation kit having at least one flat cable, at least one plug connection kit according to the first aspect, and at least one branch line.

A further aspect relates to an electrical installation that includes a through line designed as a flat cable, at least one plug connection kit according to the first aspect, and at least one branch line that is connected to the flat cable by a plug connection kit in each case.

BRIEF DESCRIPTION OF THE DRAWINGS

The appended drawings illustrate exemplary embodiments of the various aspects of the invention. The drawings show the following:

FIG. 9 shows a schematic top view of a detail of the plug-in connection according to FIGS. 3 through 8, with flexible cable ends molded onto both sides.

The drawings and the description of the drawings refer to examples of the invention, and not to the invention itself.

DESCRIPTION OF EXEMPLARY EMBODIMENTS WITH REFERENCE TO THE DRAWINGS

Figure 1:
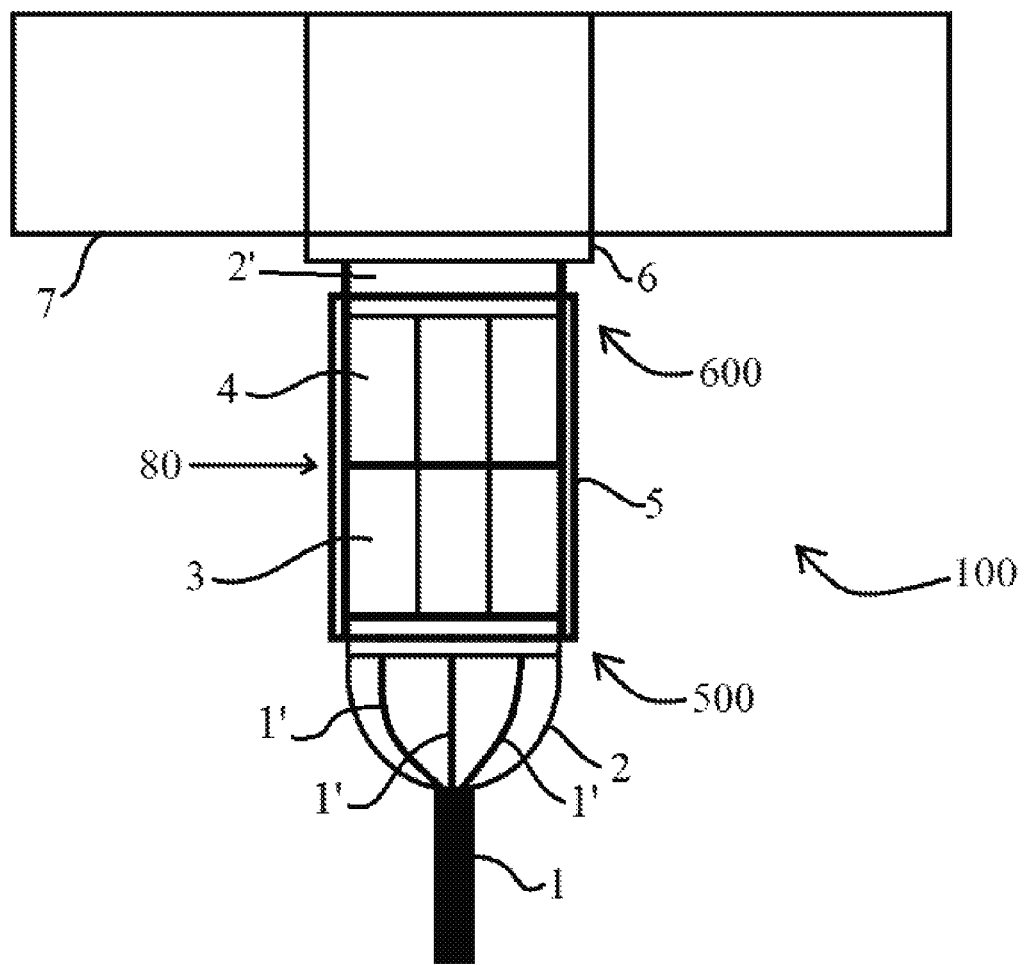
FIG. 1 schematically shows a connection of a round cable to a flat cable via a plug-in connection having a flexible cable end.

The plug connection kit according to FIG. 1 connects a multicore flat cable 7 to a multicore round cable 1. The cores of the flat cable are tapped by a connection device 6, and the current can flow through conductive elements within the connection device 6 and into a socket connected to the connection device. The socket has a socket housing 4 which is part of the described plug connection kit 100. The socket is equipped with female contact inserts 40 (see FIG. 3) which are enclosed by the socket housing 4. Male contact inserts 30 (see FIG. 3) of a plug are plugged into the female contact inserts 40 of the socket housing 4 plug at the connection point between the plug and the socket. This location at which the male and female contact inserts 30, 40 engage with one another thus forms a contact area 80.

The male contact inserts 30, the same as the female contact inserts 40, are enclosed by a plug housing 3. The socket housing 4 and the plug housing 3 are embedded in a sealing sleeve 5 in order to protect the contact area 80 from penetration of water or dust. Associated flexible cable ends 2, 2' made of an elastomer or plastic having elastic properties are in each case molded onto the plug housing 3 and the socket housing 4. The cable cores 1' of the round cable 1 are guided by the flexible cable end 2 and are connected to the male contact inserts 30 of the plug housing 3.

The plug housing 3 together with the flexible cable end 2 forms the solid plug 500. The socket housing 4 together with the flexible cable end 2' forms the solid socket 600.

The plug housing 3 as well as the socket housing 4 are manufactured via injection molding by casting plastic onto a base body 60 (see FIG. 3), which should encompass the complete casting of the base body 60. This provides additional protection from penetration of water or dust in the direction into the interior of the plug connection kit 100.

Figure 2:
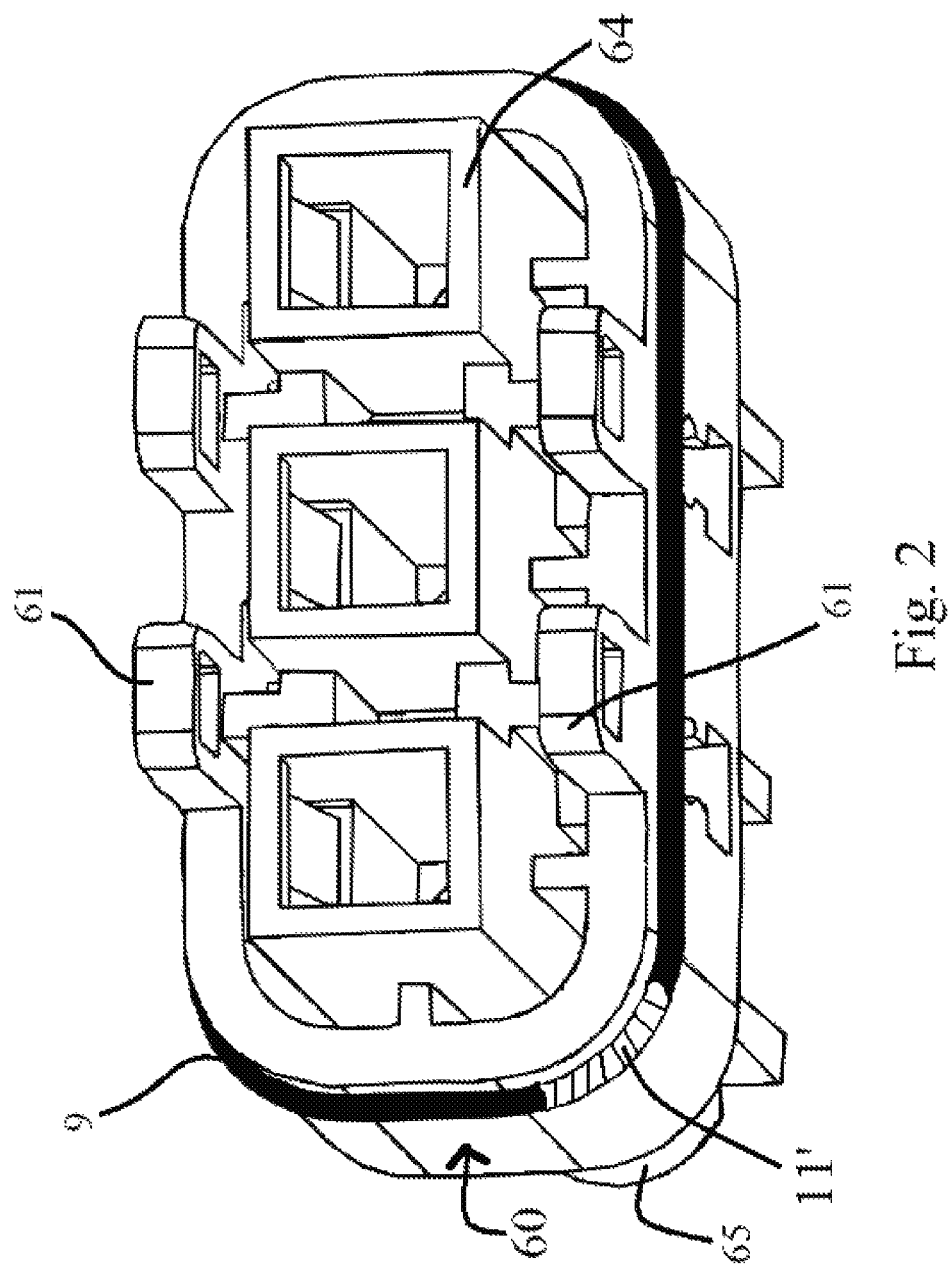
FIG. 2 shows a schematic rear view of a plug housing having a sealing ring groove, without contact inserts inserted.

The plug housing and socket housing each include a base body 60 illustrated in FIG. 2, having rectangular receptacles for the contact inserts 64, and emerging from these receptacles 64, has adjoining circular guide tubes 65, only indicated in FIG. 2, for guiding the contact tip of a male contact insert 3. At their rear-side openings (the openings into which the male contact inserts 30, not illustrated here, are inserted into the plug housing 3), the receptacles 64 having a square cross section are provided with a snap-action system 2, into which the male contact inserts 30 (not illustrated here) can snap in in a specified position.

In addition, the base body 60 is equipped with brackets 61 which emerge from the front side at its top and bottom. These brackets 61 are provided as part of a snap-action system that is used to lock the sealing sleeve 5 (see FIG. 3) in a specified position on the plug housing 3.

The base body 60 is provided on its outer side with a groove 11' to accommodate a sealing ring 9 made of rubber. The sealing ring 9 is intended to prevent water from flowing along the plug housing 3 and into the interior of the plug-in connection when the plug housing 3 is inserted into the sealing sleeve 5, not illustrated in FIG. 2.

Figure 3:
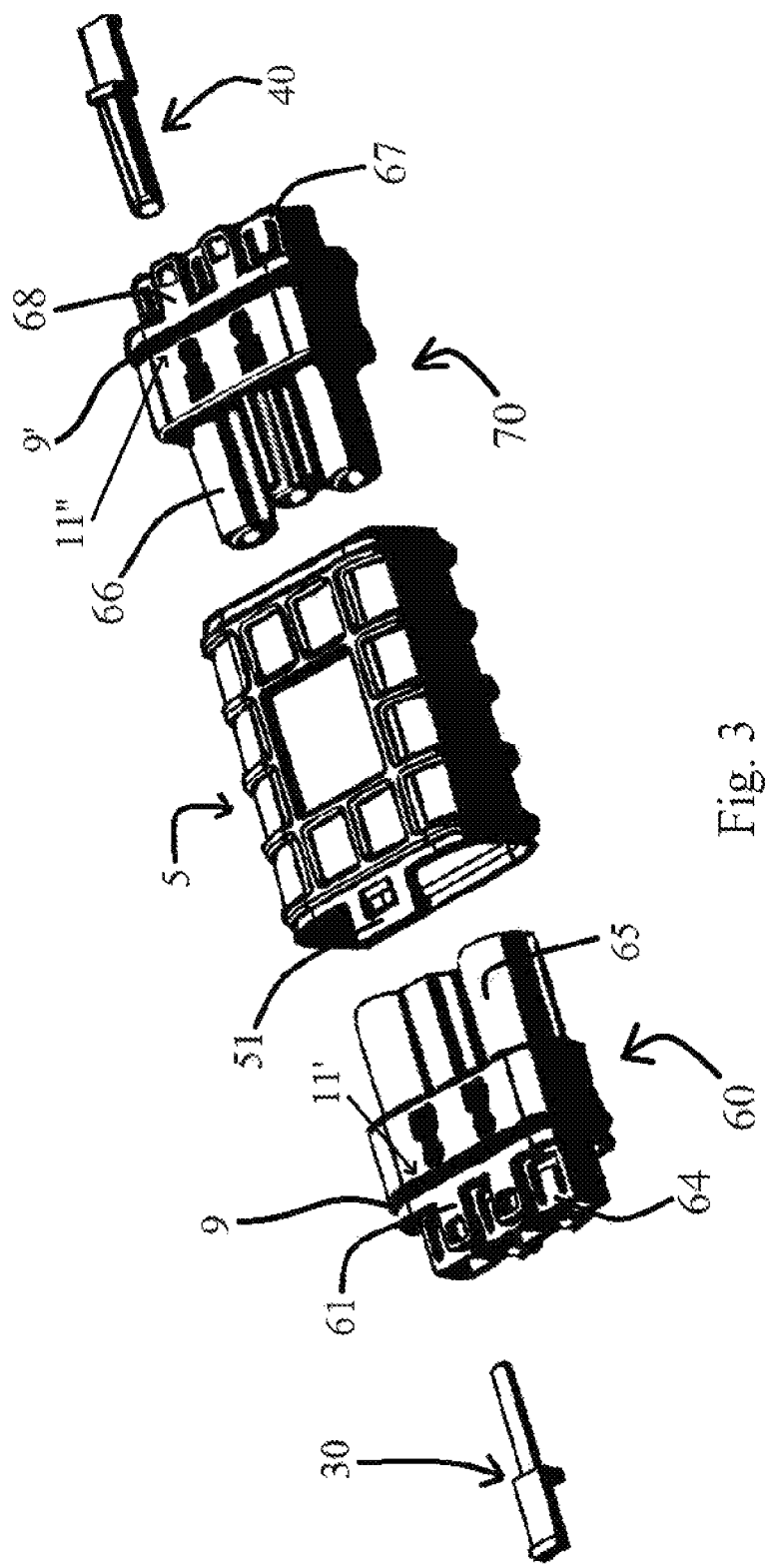
FIG. 3 shows an exploded view of a plug-in connection together with a sealing sleeve and female and male contact inserts, in which a plug housing and a socket housing each bear a sealing ring in a groove.

The overall plug connection kit 100 is illustrated in an exploded view in FIG. 3. During manufacture of the plug, male contact inserts 30 are pushed through the rectangular receptacles 64 in the base body 60 and then fixed in a position in which they protrude with their tip from the guide tubes 65. Likewise, the female contact inserts 40 are guided through receptacles having a square cross section 67, and via snap inserts, not illustrated in FIG. 3, are fixed in a position in which their tip protrudes from the guide tubes 66. The female contact inserts have a cavity in their tip in which they are able to accommodate the contact tips of the male contact inserts. The plug housing 3 or the socket housing 4, which encloses the male 30 contact inserts or female contact inserts 40, respectively, is manufactured by molding the plastic onto the base body.

The plug housing 3 as well as the socket housing 4 (see FIG. 1) are provided with grooves 11',11" on the top side of their respective base body 60 or 70, into which a sealing ring 9, 9', respectively, is inserted. The socket housing 4 and the plug housing 3 are pushed into the sealing sleeve 5 so that the female and male contact inserts inserted into the particular housings contact one another. In this position, the sealing sleeve 5 is fixed, via a snap-action system made up of a bracket 61, to the plug housing 3 and to a clip element 51 on the side of the sealing sleeve 5 into which the plug housing is to be inserted.

Figure 4:
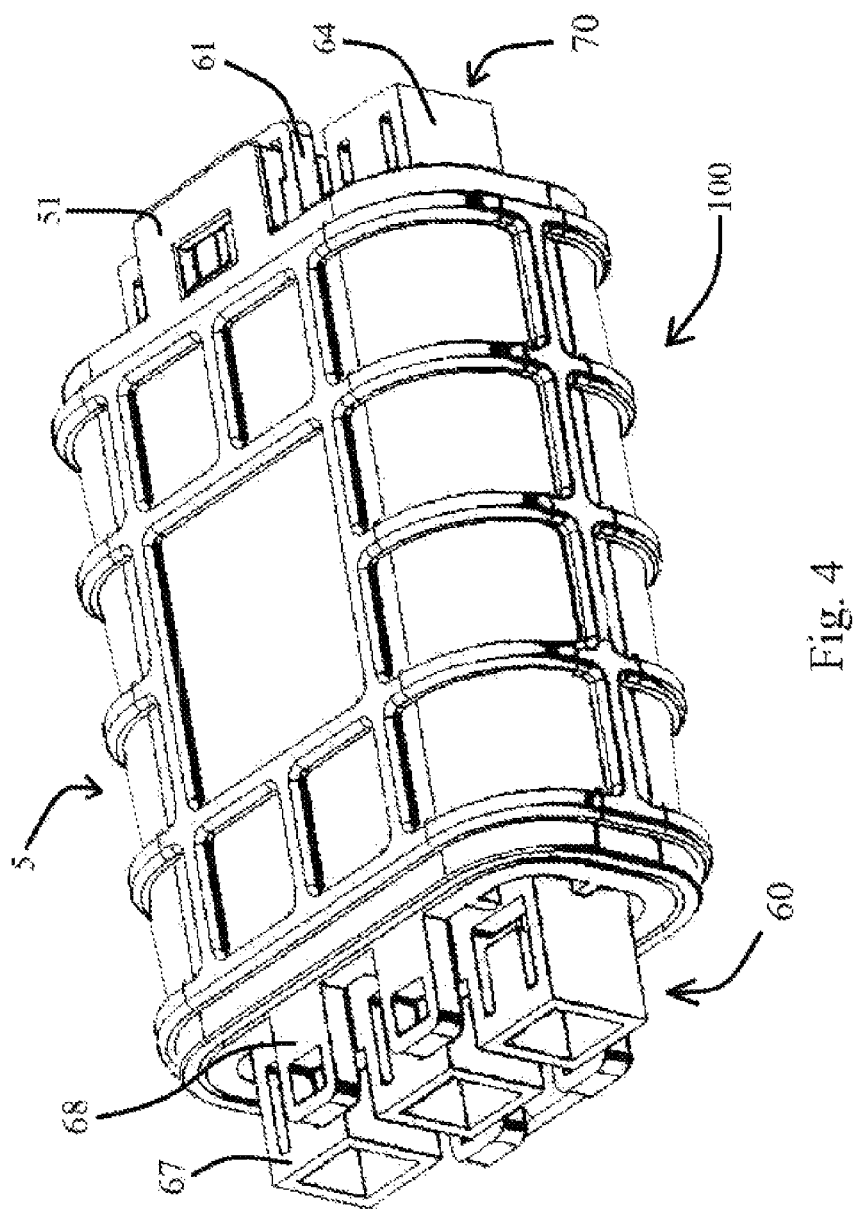
FIG. 4 shows a schematic illustration of a detail of the plug-in connection from FIG. 3 in the assembled state.

The plug connection kit 100 is illustrated in FIG. 4 in the assembled state, but without cast-on plastic. The single elements that protrude from the sealing sleeve 5 are the receptacles 64, 63, having a rectangular cross section, in the plug housing 3 or in the socket housing 4, and the brackets 61, 68 that emerge therefrom, wherein the clip element 51 of the sealing sleeve is snapped into the bracket 61 of the plug housing.

Figure 5:
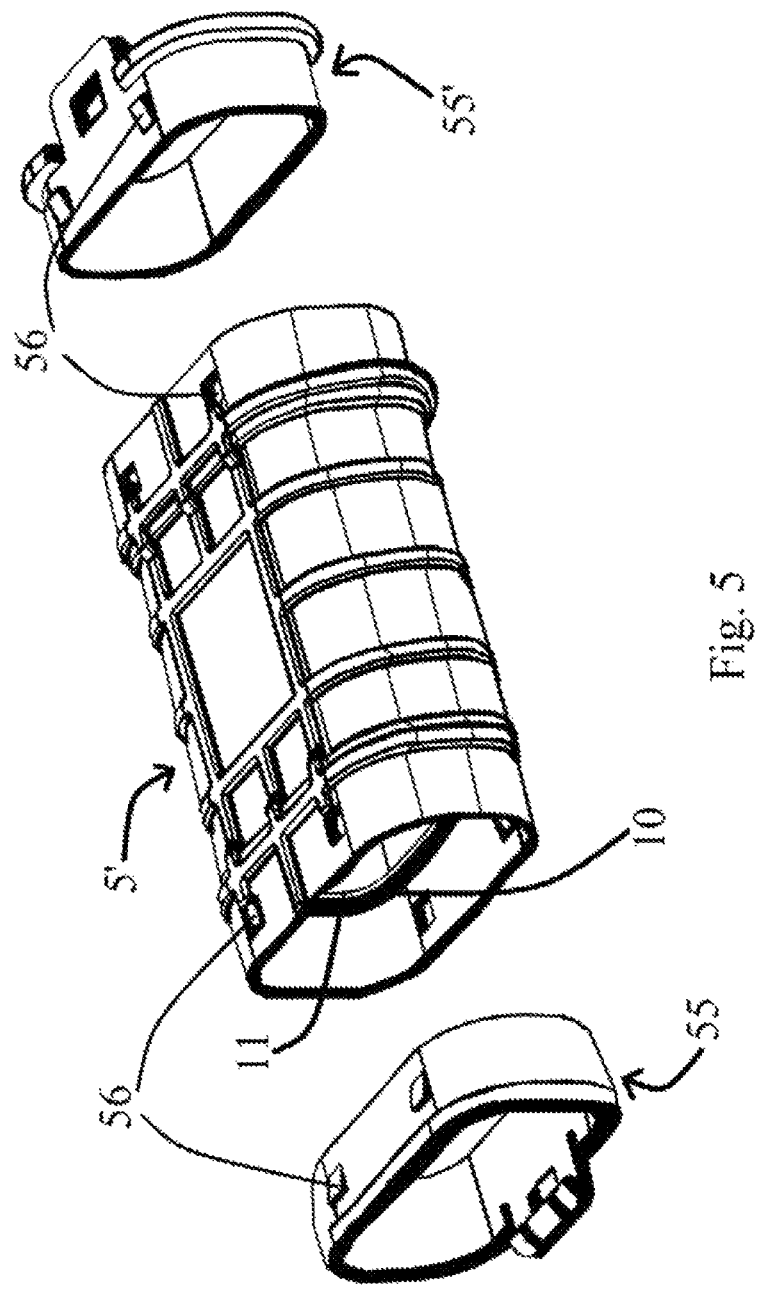
FIG. 5 shows an exploded view of a sealing sleeve with a sealing ring inserted into a groove on the inlet side and outlet side, with sealing plugs on both sides for fixing this sealing ring.

Another embodiment of a sealing sleeve 5' is illustrated in an exploded view in FIG. 5. The sealing sleeve 5', in contrast to the sealing sleeve 5 shown in the preceding figures (see FIG. 3), has a groove 11 for accommodating a sealing ring 10 (made of rubber, for example) in its inlet or outlet areas. For fixing the sealing rings 10, of which only one is shown in the schematic illustration in FIG. 5, the sealing sleeve 5' also includes inlet- and outlet-side sealing plugs 55, 55', which may likewise be fixed to the inlet or outlet of the sealing sleeve 5' by means of respectively associated snap-in systems 56, 56'.

Figure 6:
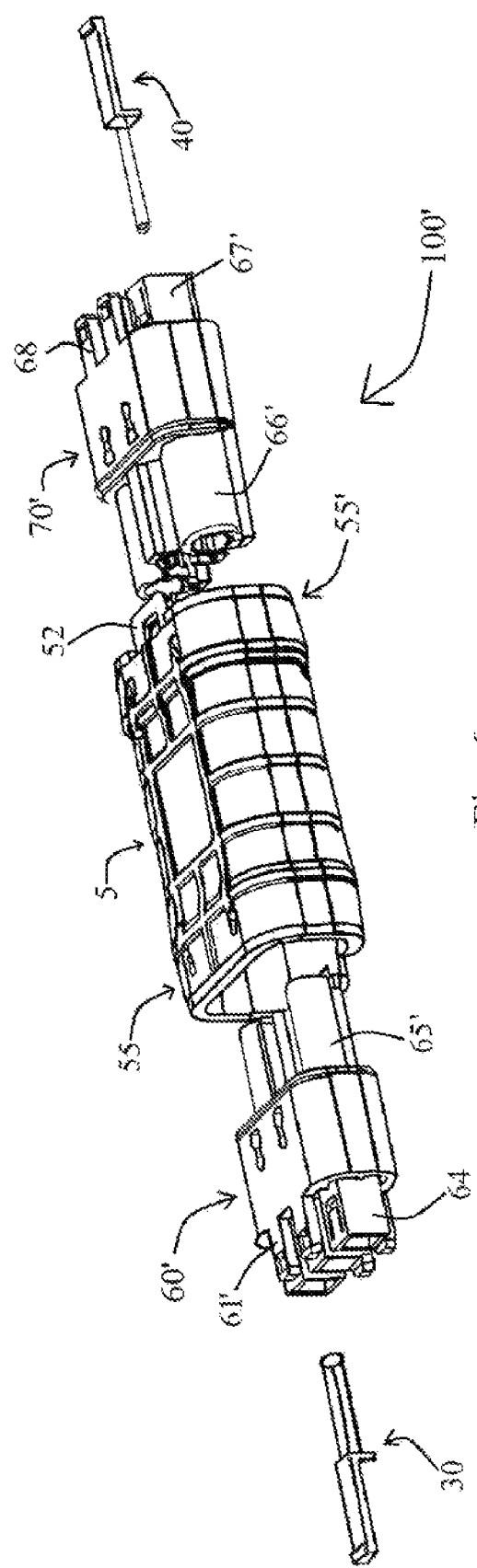
FIG. 6 shows an exploded view of a detail of the plug-in connection, with a sealing sleeve having an interior sealing ring and sealing plugs connected on both sides.

FIG. 6 illustrates the sealing sleeve 5' with inserted sealing rings 10 (not shown in FIG. 6) in an exploded view, together with the other parts of a plug connection kit 100'. The female and male contact inserts 30, 40 are identical to those shown in FIG. 3. However, the base bodies 60', 70' and the plug housing 3' or socket housing 4' enclosing them differ from those in FIG. 3, in that on their top side no sealing rings 9 are inserted. In this embodiment of the sealing sleeve 5', the function of these sealing rings is taken over by the sealing rings 10 placed at the inlet and outlet of the sealing sleeve 5'. Therefore, it is not necessary to place sealing rings 9, 9' on the housings.

Figure 7:
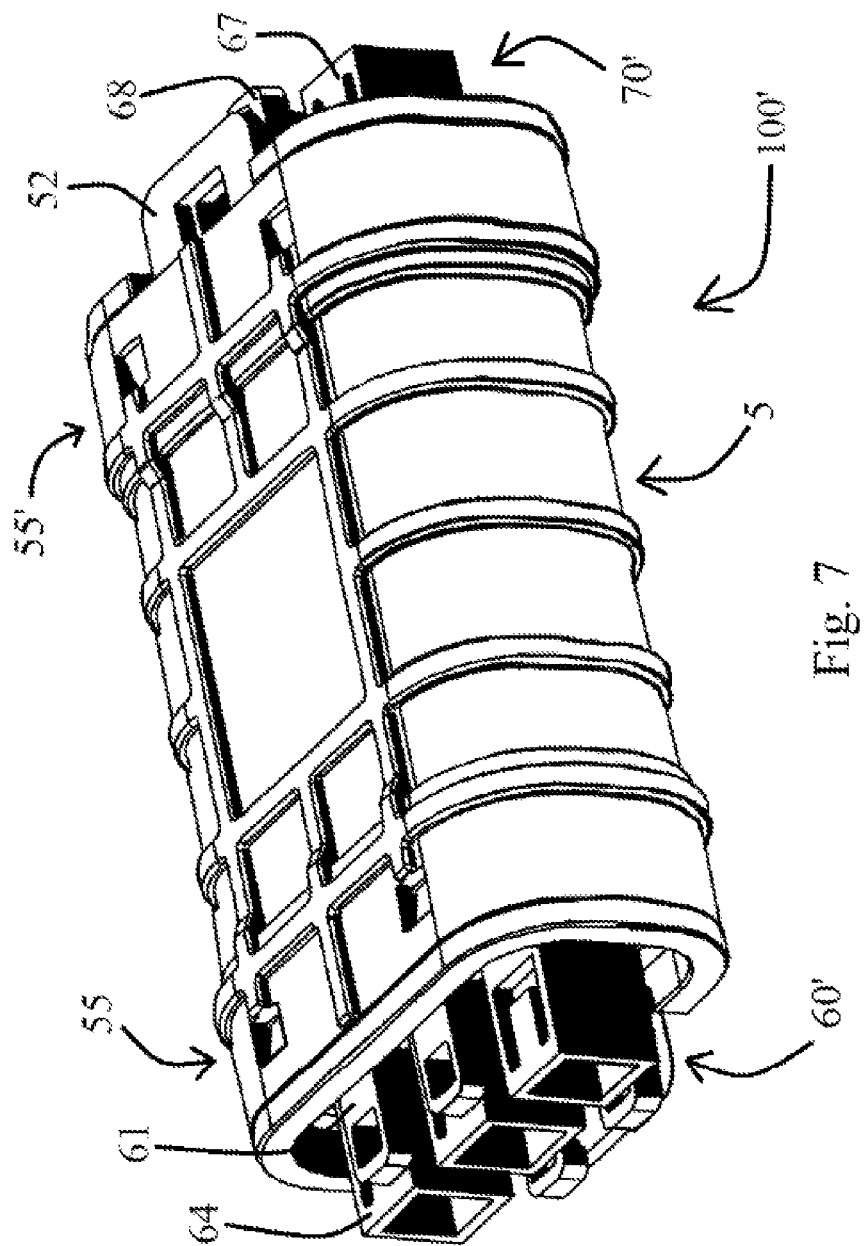
FIG. 7 shows the detail of the plug-in connection from FIG. 7 [sic; 6] in the assembled state.

The plug connection kit 100' is shown in the assembled state, but without cast-on plastic, in FIG. 7. The plug connection kit 100', except for the use of the sealing sleeve 5' illustrated in FIGS. 4 and 5 instead of the sealing sleeve 5 illustrated in FIG. 3, is practically identical to the plug connection kit 100 illustrated in an exploded view in FIG. 3.

Figure 8:
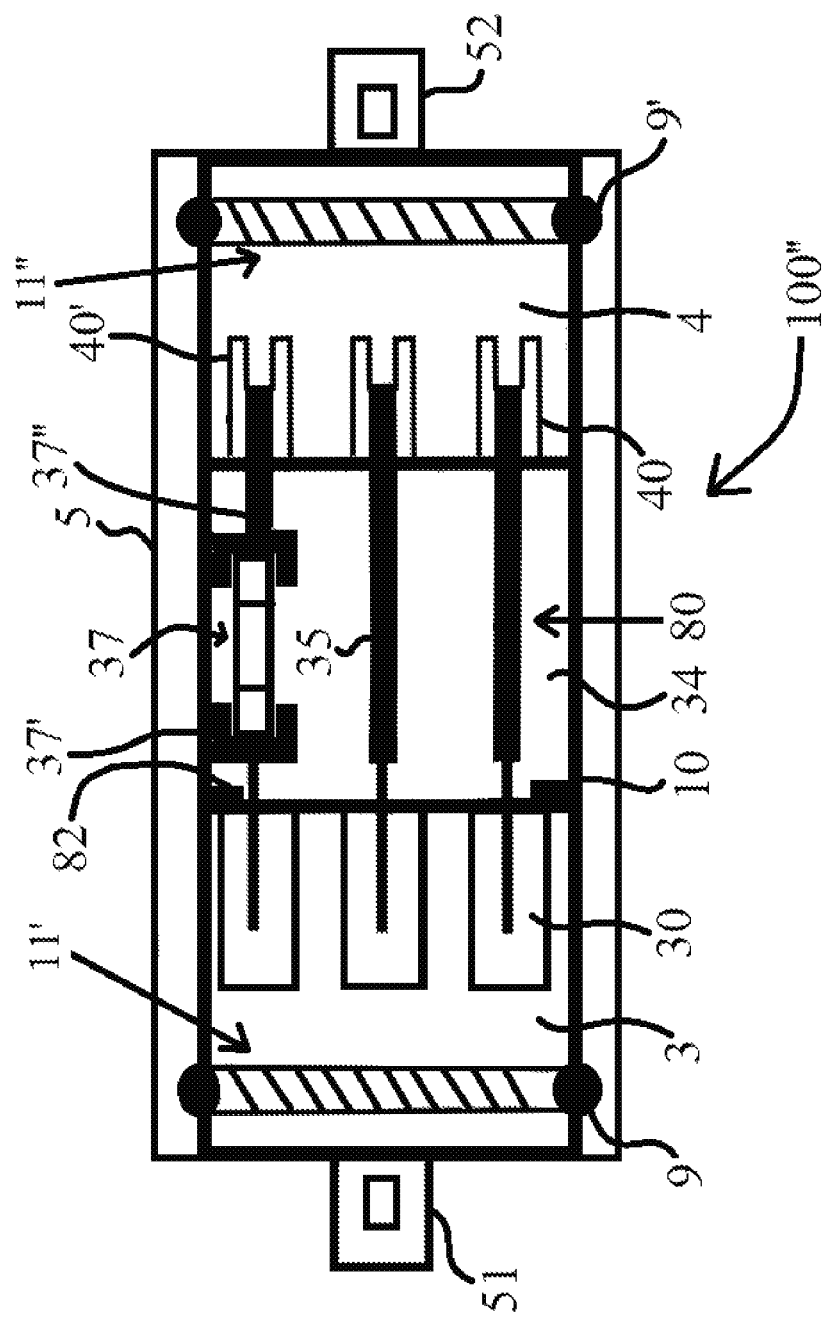
FIG. 8 shows a schematic sectional view of a detail of the plug-in connection with a fuse block inserted therein for providing fuse protection to the connection of two phase conductors.

As a supplement to the previously shown embodiments, in the embodiment shown in FIG. 8 a fuse block 34 is provided between the plug housing 3 and the socket housing 4. The fuse block 34 includes three conducting elements 35. A conducting element, which contacts female contact elements 40 and male contact elements 30 that are to be connected to a phase-conducting core, as a fuse socket having securing plates 37' or 37" is provided in each case on the plug side and the socket side. A fuse insert 37, for example an overcurrent fuse, is inserted into this fuse socket that is formed by the securing plates 37', 37".

The contact tips of the male contact elements 30, which are connected to neutral conducting cores or fuse conductor cores (not live), penetrate into the conducting elements 35 without a securing plate. These conducting elements 35 at their opposite end in turn penetrate into female contact elements 40. The connecting elements 35 thus form a contact area 80 between the plug housing 3 and the socket housing 4.

In the embodiment illustrated in FIG. 8, a variant of the plug-in connection is selected in which the sealing rings 9, 9' rest in grooves on the outer surface of the plug housing or of the socket housing, and are not already inserted into the sealing sleeve 5 (see FIG. 3). The sealing sleeve is equipped with clip elements 51, 52 on both sides.

However, it is understood by those skilled in the art that in the embodiment of the plug connection kit 100" depicted in FIG. 8, the sealing sleeve 5' (see FIG. 5) may also be selected, in which the sealing rings 10 (not illustrated in FIG. 8) are inserted at the inlets and outlets of the sealing sleeve.

The plug connection kit 100 illustrated in FIG. 9, whose design corresponds to that of the plug connection kit 100 according to the exploded view from FIG. 3, having base bodies 60, 70 with plastic that is already cast on, and which thus form a plug housing 3 or a socket housing 4, has two flexible cable ends, namely, a flexible cable end 2' on the socket side and a flexible cable end 2 on the plug side. The cable ends have been produced by injection molding or extrusion coating of the plug housing 3 (not visible in FIG. 9) or of the socket housing 4 (likewise not visible in FIG. 9) with an elastomer.

It is also understood by those skilled in the art that the sealing sleeve 5' (see FIG. 5) may be selected instead of the sealing sleeve 5 (see FIG. 3) shown in FIG. 9. In addition, a plug connection kit 100" according to FIG. 8, having a fuse block between the plug housing and the socket housing, may be selected instead of the design of the plug connection kit 100 according to FIG. 3, without a fuse block between the plug housing and the socket housing.

The invention claimed is:
1. A plug connection kit for connecting a branch line to a through line, comprising:
a plug housing that encloses male contact inserts,
a socket housing that encloses female contact inserts, at least two flexible cable ends, wherein one flexible cable end is molded onto the plug housing and one flexible cable end is molded onto the socket housing, wherein the female and male contact inserts are each fixedly connected to cable cores in the flexible cable ends, wherein the plug housing and the socket housing are each manufactured by casting plastic onto a base body with the contact inserts inserted and flexible cable ends connected thereto, thus forming a solid one-piece plug and a solid one-piece socket, wherein the female and male contact inserts are electrically connectable to one another in a contact area between the plug housing and the socket housing, a sealing sleeve that encases the plug housing, the socket housing, and the contact area between the two housings in order to protect the plug connection kit from penetration of water and/or dust, wherein the plug connection kit includes a fuse block, placed in the contact area, having at least one fuse holder and at least one fuse insert, wherein the fuse holder is able to be uninstalled only on the side of the socket housing in order to replace the fuse insert, wherein the fuse holder is able to be uninstalled after pulling out the socket housing together with female contact inserts having a securing plate, as a result of which, the fuse insert already being exposed for replacement.

2. The plug connection kit according to claim 1, wherein the material from which the plug housing and the socket housing are cast includes at least one plastic, and the material that is molded onto this housing to form the flexible cable ends includes at least one elastomer.

3. The plug connection kit according to claim 1, wherein a seal is mounted in each case on the plug housing and the socket housing in order to protect the contact area from penetration of water or dust.

4. The plug connection kit according to claim 3, wherein the seal is a sealing ring, and the plug housing and the socket housing each have a groove on their outer side for accommodating the sealing ring.

5. The plug connection kit according to claim 1, wherein the sealing sleeve at its inner side is equipped with a sealing element in each case in the inlet area and outlet area of the sealing sleeve.

6. The plug connection kit according to claim 5, wherein the sealing element is a sealing ring, and the sealing sleeve has a groove in its inlet and outlet areas for accommodating the sealing ring.

7. The plug connection kit according to claim 1, wherein the sealing sleeve has a lock with which the sealing sleeve is able to be fixed to the socket housing or the plug housing or to both.

8. The plug connection kit according to claim 7, wherein the lock is designed as a snap-action system that is mounted on one end of the sealing sleeve, and that can snap onto a bracket on the plug housing or on the socket housing.

9. The plug connection kit according to claim 1, wherein the female and male contact inserts are made of metal and are each fixedly connected to cable cores in the flexible cable ends by ultrasonic welding.

10. The plug connection kit according to claim 1, wherein the female and male contact inserts are able to snap into a contact position in the plug housing or the socket housing by means of a snap-action system that is provided in the plug housing or socket housing.

11. The plug connection kit according to claim 1, wherein the sealing sleeve has a stop for the plug housing, so that the fuse insert replacement can be carried out only in the absence of current.

12. An installation kit having
at least one flat cable,
at least one plug connection kit according to claim 1,
at least one branch line.

13. An electrical installation comprising:
a through line designed as a flat cable,
at least one plug connection kit according to claim 1,
at least one branch line that is connected to the flat cable by a plug connection kit in each case.

* * * * *